(12) United States Patent
Sekiguchi et al.

(10) Patent No.: US 11,597,787 B2
(45) Date of Patent: Mar. 7, 2023

(54) PARTICLE AND METHOD OF PRODUCING THE PARTICLE

(71) Applicants: CANON KABUSHIKI KAISHA, Tokyo (JP); CANON MEDICAL SYSTEMS CORPORATION, Tochigi (JP)

(72) Inventors: Takeshi Sekiguchi, Kanagawa (JP); Kengo Kanazaki, Kanagawa (JP)

(73) Assignees: CANON KABUSHIKI KAISHA, Tokyo (JP); CANON MEDICAL SYSTEMS CORPORATION, Tochigi (JP)

( * ) Notice: Subject to any disclaimer, the term of this patent is extended or adjusted under 35 U.S.C. 154(b) by 254 days.

(21) Appl. No.: 17/073,666

(22) Filed: Oct. 19, 2020

(65) Prior Publication Data

US 2021/0122863 A1 Apr. 29, 2021

(30) Foreign Application Priority Data

Oct. 25, 2019 (JP) .............................. JP2019-194679

(51) Int. Cl.
  *C08F 220/30* (2006.01)
  *C08F 220/32* (2006.01)
  *C08J 3/05* (2006.01)

(52) U.S. Cl.
  CPC .............. *C08F 220/325* (2020.02); *C08J 3/05* (2013.01); *C08J 2333/14* (2013.01)

(58) Field of Classification Search
  CPC ...... C08F 220/325; C08F 212/08; C08F 6/16; C08L 33/14; C08J 3/12
  See application file for complete search history.

(56) References Cited

U.S. PATENT DOCUMENTS

| | | | |
|---|---|---|---|
| 5,166,077 A | 11/1992 | Kihara et al. | |
| 2002/0077435 A1* | 6/2002 | DeSimone | C08F 265/06 526/341 |
| 2009/0047685 A1 | 2/2009 | Kohno et al. | |
| 2011/0039995 A1* | 2/2011 | Lohmeijer | C08F 2/24 524/561 |
| 2012/0226258 A1* | 9/2012 | Otto | A61M 1/3475 604/500 |

FOREIGN PATENT DOCUMENTS

| | | | | |
|---|---|---|---|---|
| EP | 3 663 761 A1 | 6/2020 | | |
| EP | 3663761 A1 * | 6/2020 | ........... | G01N 33/531 |
| JP | 63-273060 A | 11/1988 | | |
| JP | 2019-028050 A | 2/2019 | | |
| WO | 2007/063616 A1 | 6/2007 | | |
| WO | WO-2009073791 A1 * | 6/2009 | ............. | A61B 50/30 |

OTHER PUBLICATIONS

Hiroshi Nemoto et al., "Study on High Sensitive Immunoassay by Particle Agglutination Reaction using Poly Glycidyl Methacrylate," Nihon University, College of Industrial Technology, 40th Academic Lecture Synopsis No. 40, Conference of Department of Applied Molecular Chemistry No. 9, pp. 1-2 (NA).

* cited by examiner

*Primary Examiner* — Karuna P Reddy
(74) *Attorney, Agent, or Firm* — Venable LLP

(57) ABSTRACT

Provided is a particle suitable for a specimen test, which has high sensitization efficiency in a reaction with an antibody, shows high detection sensitivity as a latex reagent, hardly agglutinates during its storage, and hardly causes nonspecific adsorption even when not post-coated. The particle is a particle including a copolymer containing a monomer unit derived from a styrene-based monomer and a monomer unit derived from a glycidyl group-containing monomer, the particle being represented by the following general formula (1):

General Formula (1)

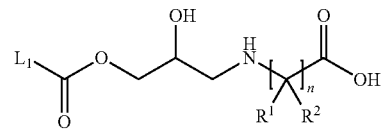

in the general formula (1), $L_1$ represents a copolymer moiety containing the monomer unit derived from the styrene-based monomer and the monomer unit derived from the glycidyl group-containing monomer, "n" represents from 4 to 11, and $R^1$ and $R^2$ each represent a hydrogen atom, an alkyl group, or a halogen.

8 Claims, No Drawings

PARTICLE AND METHOD OF PRODUCING THE PARTICLE

BACKGROUND OF THE INVENTION

Field of the Invention

The present disclosure relates to a particle and a method of producing the particle.

Description of the Related Art

An immunoassay reagent using latex particles has been used in various clinical test items. The principle of the reagent is as described below. The concentration of an antigen in a sample to be tested is determined by detecting an increase in turbidity as an optical change in absorbance, transmitted light intensity, or scattered light intensity through use of a measuring and automatically analyzing apparatus based on such a property that an antibody-sensitized latex reagent and the antigen are bonded to each other by an antigen-antibody reaction to agglutinate.

At present, the immunoassay reagent using the latex particles has been required to have sensitivity even higher than before so as to be capable of detecting a slighter amount of an antigen so that local inflammation or the lesion of a small site can be discovered early.

As a measure to further improve the sensitivity, in, for example, Nihon University, College of Industrial Technology, 40th Academic Lecture Synopsis No. 40, Conference of Department of Applied Molecular Chemistry No. 9, Study on High Sensitive Immunoassay by Particle Agglutination Reaction using Poly Glycidyl Methacrylate or International Publication No. WO 2007/063616, the concentration of an antigen in a sample to be tested is measured with high sensitivity by chemically modifying the surfaces of the latex particles and introducing, as a spacer molecule, an amino acid for forming a human protein.

In addition, an improvement in sensitization efficiency between the latex particles and an antibody has been required for preventing the loss of the antibody at the time of the sensitization of the antibody to the latex particles.

In addition to the foregoing, the latex reagent is required to have such performance as described below. The reagent is required to have such storage stability as not to agglutinate during its storage, or to be free of nonspecific adsorptivity so as not to show a false positive reaction. Further, antibody-sensitized particles are preferably capable of being used as they are without being post-coated with an albumin, a hydrophilic polymer, or the like.

Meanwhile, there has been known an example in which an ω-amino acid is added as a component that suppresses nonspecific agglutination instead of an amino acid for forming a human protein to sensitized or unsensitized insoluble carrier particles (Japanese Patent Application Laid-Open No. 2019-28050). In addition, there has been known an example in which when an ω-amino acid is introduced as a spacer molecule into a carboxylated latex by using a water-soluble carbodiimide, the amount of an antigen or an antibody in a liquid to be tested is measured accurately and with satisfactory reproducibility over a wide concentration range of the liquid to be tested while excellent dispersion stability and excellent storage stability are achieved, and no nonspecific agglutination reaction is caused (Japanese Patent Application Laid-Open No. S63-273060).

However, the latex particles described in those literatures have not been sufficient in terms of detection sensitivity and sensitization efficiency. Further, there has been still remained a problem in that the particles need to satisfy all of such conditions as described below so as to be used as a latex reagent: the particles do not agglutinate during their storage; the particles do not cause any nonspecific adsorption; and the particles can be used without being post-coated.

SUMMARY OF THE INVENTION

An object of the present disclosure is to provide a particle that satisfies all of those conditions, and a method of producing the particle.

A particle according to the present disclosure is a particle including a copolymer containing a monomer unit derived from a styrene-based monomer and a monomer unit derived from a glycidyl group-containing monomer, the particle being represented by the following general formula (1):

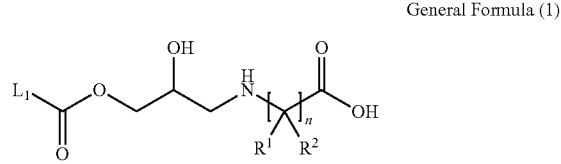

General Formula (1)

in the general formula (1), $L_1$ represents a copolymer moiety containing the monomer unit derived from the styrene-based monomer and the monomer unit derived from the glycidyl group-containing monomer, "n" represents from 4 to 11, and $R^1$ and $R^2$ each represent a hydrogen atom, an alkyl group, or a halogen.

Further features of the present invention will become apparent from the following description of exemplary embodiments.

DESCRIPTION OF THE EMBODIMENTS

The inventors have produced an anti-CRP antibody-sensitized latex reagent by: chemically modifying the surfaces of latex particles each including a copolymer containing a monomer unit derived from a styrene-based monomer and a monomer unit derived from a glycidyl group-containing monomer; and introducing a spacer molecule. An investigation on an improvement in sensitivity of the latex reagent has found that when glycine that is an amino acid for forming a human protein is used as a spacer like Nihon University, College of Industrial Technology, 40th Academic Lecture Synopsis No. 40, Conference of Department of Applied Molecular Chemistry No. 9, Study on High Sensitive Immunoassay by Particle Agglutination Reaction using Poly Glycidyl Methacrylate described in the foregoing, high sensitivity and high sensitization efficiency are not obtained. Meanwhile, the inventors have found when an ω-amino acid having a specific number of carbon atoms is introduced as a spacer molecule, high sensitivity and high sensitization efficiency are obtained. Thus, the inventors have completed the present disclosure.

In addition, the inventors have produced, with reference to Japanese Patent Application Laid-Open No. 2019-28050, a liquid by: adding an ω-amino acid to an aqueous dispersion of latex particles each including a copolymer containing a monomer unit derived from a styrene-based monomer and a monomer unit derived from a glycidyl group-containing monomer; and adjusting the pH of the mixture with sodium hydroxide. However, the inventors have found that the agglutination of the particles immediately occurs, and hence the liquid cannot be used as a latex reagent.

In addition, in Japanese Patent Application Laid-Open No. S63-273060, after the introduction of ε-aminocaproic acid that is an ω-amino acid as a spacer into the carboxylated latex, the resultant is post-coated with bovine serum albumin. However, it is assumed that when the post-coating is not performed, nonspecific adsorption may occur.

The embodiments of the present disclosure are described in detail below. However, the technical scope of the present disclosure is not limited to the embodiments. A particle according to an embodiment of the present disclosure is typically a latex particle, and is used in an agglutination method. The agglutination method is, for example, a latex agglutination method (e.g., a latex immunoagglutination method). The latex agglutination method is used in, for example, a specimen test.

The latex particle of this embodiment is a latex particle for latex immunoagglutination, the particle including a copolymer containing a monomer unit derived from a styrene-based monomer and a monomer unit derived from a glycidyl group-containing monomer, the particle being represented by the following general formula (1). In the general formula (1), $L_1$ represents a copolymer moiety containing the monomer unit derived from the styrene-based monomer and the monomer unit derived from the glycidyl group-containing monomer, "n" represents from 4 to 11, and $R^1$ and $R^2$ each represent a hydrogen atom, an alkyl group, or a halogen.

General Formula (1)

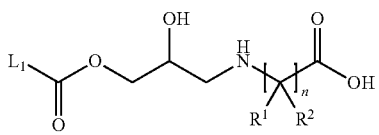

The latex particle of this embodiment is a particle for a specimen test, and is specifically a particle for use in the latex immunoagglutination method. The latex particle can immobilize a ligand. The resultant ligand-sensitized particle is bonded to a target substance, and hence the amount of the target substance can be measured by the latex immunoagglutination method.

The latex particle for a specimen test according to this embodiment includes, on its surface, a carboxyl group that can chemically immobilize an antibody or an antigen as a ligand.

A parent particle of this embodiment includes the copolymer containing the monomer unit derived from the styrene-based monomer and the monomer unit derived from the glycidyl group-containing monomer.

Although the chemical structure of the monomer unit derived from the styrene-based monomer of this embodiment is not limited to the extent that the object of the present disclosure can be achieved, the unit is preferably at least one kind selected from the group consisting of styrenes. Examples of the styrenes include styrene, α-methyl styrene, β-methyl styrene, o-methyl styrene, m-methyl styrene, p-methyl styrene, 2,4-dimethyl styrene, p-n-butyl styrene, p-tert-butyl styrene, p-n-hexyl styrene, p-n-octylstyrene, p-n-nonylstyrene, p-n-decylstyrene, p-n-dodecyl styrene, p-methoxystyrene, and p-phenylstyrene.

Although the chemical structure of the monomer unit derived from the glycidyl group-containing monomer of this embodiment is not limited to the extent that the object of the present disclosure can be achieved, the unit is preferably at least one kind selected from glycidyl methacrylate and glycidyl acrylate.

With regard to the copolymer containing the monomer unit derived from the styrene-based monomer and the monomer unit derived from the glycidyl group-containing monomer of this embodiment, a composition ratio between the monomer units is not limited to the extent that the object of the present disclosure can be achieved. A ratio "the monomer unit derived from the styrene-based monomer"/"the monomer unit derived from the glycidyl group-containing monomer" is preferably 0.1 or more and 10 or less (mole fraction), more preferably 0.2 or more and 5 or less (mole fraction), still more preferably 0.5 or more and 2 or less (mole fraction). The preferred ranges are numerical ranges determined by a relationship among the strength of the parent particle derived from the "styrene-based monomer", the ability thereof to suppress nonspecific adsorption derived from the "glycidyl group-containing monomer", and the efficiency of a reaction between a carboxyl group on the surface of the particle and a ligand. When the above-mentioned relationships are satisfied, a balance among the particle strength, the nonspecific adsorption-suppressing ability, and the efficiency of the reaction with the ligand is satisfactory.

In the latex particle of this embodiment, a spacer having a carboxyl group that can immobilize a ligand is present on the surface of the parent particle, and is represented by the following general formula (1). In the general formula (1), $L_1$ represents a copolymer moiety containing the monomer unit derived from the styrene-based monomer and the monomer unit derived from the glycidyl group-containing monomer, "n" represents from 4 to 11, and $R^1$ and $R^2$ each represent a hydrogen atom, an alkyl group, or a halogen.

General Formula (1)

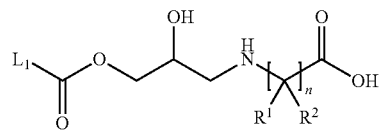

The spacer of this embodiment having a carboxyl group that can immobilize a ligand is a side chain moiety of the glycidyl group-containing monomer, and is bonded to the polymer skeleton of the glycidyl group-containing monomer. A spacer molecule can be bonded to a glycidyl group by using a strong base, such as sodium hydroxide or potassium hydroxide, at a reaction temperature of from 50° C. to 90° C., and the resultant is purified under a condition such as centrifugal separation or dialysis. The spacer molecule is selected from ω-amino acids in each of which "n" represents from 4 to 11, that is, for example, 5-aminopentanoic acid, 6-aminohexanoic acid, 7-aminoheptanoic acid, 8-aminooctanoic acid, 9-aminononanoic acid, 10-aminodecanoic acid, 11-aminoundecanoic acid, and 12-aminododecanoic acid, and any such acid is preferred from the viewpoints of sensitivity, storage stability, and a nonspecific adsorption-suppressing ability. However, the spacer molecule is not limited thereto as long as those kinds of performance are not inhibited. However, in the case where "n" represents from 1 to 3, the latex particle may have low detection sensitivity when used as a latex reagent, and in the case where "n" represents 12 or more, the particle may be reduced in stability in water to be liable to agglutinate because the particle has higher lipid solubility when used as a latex reagent.

In addition, another embodiment of the present disclosure is a latex particle for a specimen test, the particle including a copolymer containing a monomer unit derived from a styrene-based monomer and a monomer unit derived from a glycidyl group-containing monomer, in which the general formula (1) further includes a site represented by the following general formula (2). In the general formula (2), * represents a site to be bonded to $L_1$ of the general formula (1), "m" represents from 2 to 4, and $R^3$ and $R^4$ each represent a hydrogen atom, an alkyl group, or a halogen. However, in the case where "n" in the general formula (1) represents from 1 to 3, the latex particle may have low detection sensitivity when used as a latex reagent, and in the case where "n" therein represents 12 or more, the particle may be reduced in stability in water to be liable to agglutinate because the particle has higher lipid solubility when used as a latex reagent.

General Formula (2)

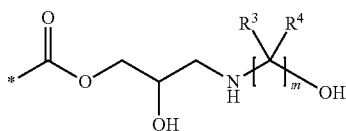

A spacer molecule can be bonded to a glycidyl group by using a strong base, such as sodium hydroxide or potassium hydroxide, at a reaction temperature of from 50° C. to 90° C., and the resultant is purified under a condition such as centrifugal separation or dialysis. The spacer molecule is selected from the ω-amino acids listed in the foregoing, and at the same time, an amino alcohol, such as ethanolamine, propanolamine, 4-amino-1-butanol, or 3-amino-1,2-propanediol, is selected.

In addition, still another embodiment of the present disclosure is a latex particle for a specimen test, the particle including a copolymer containing a monomer unit derived from a styrene-based monomer and a monomer unit derived from a glycidyl group-containing monomer, in which the general formula (1) further includes a site represented by the following general formula (3). In the general formula (3), ** represents a site to be bonded to $L_1$ of the general formula (1), "m" represents from 2 to 4, and $R^3$ and $R^4$ each represent a hydrogen atom or a hydroxy group. However, in the case where "n" in the general formula (1) represents from 1 to 3, the latex particle may have low detection sensitivity when used as a latex reagent, and in the case where "n" therein represents 12 or more, the particle may be reduced in stability in water to be liable to agglutinate because the particle has higher lipid solubility when used as a latex reagent.

General Formula (3)

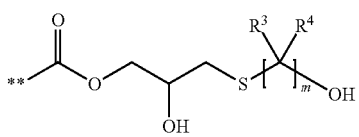

A spacer molecule can be bonded to a glycidyl group by using a strong base, such as sodium hydroxide or potassium hydroxide, at a reaction temperature of from 50° C. to 90° C., and the resultant is purified under a condition such as centrifugal separation or dialysis. The spacer molecule is selected from the ω-amino acids listed in the foregoing, and at the same time, a mercapto alcohol, such as 2-mercaptoethanol, 3-mercapto-1-propanol, 4-mercapto-1-butanol, or 3-mercapto-1,2-propanediol, is selected.

The parent particle of this embodiment may be crosslinked. The parent particle can be crosslinked by using a monomer such as divinylbenzene at the time of the synthesis of the particle. When the parent particle is crosslinked, the physical strength of the particle is improved, and the improvement is advantageous for the handling of the parent particle (e.g., its production or centrifugal separation at the time of ligand immobilization). The use of divinylbenzene improves the solvent resistance of the parent particle.

The particle diameter of the latex particle of this embodiment is 0.05 μm or more and 1 μm or less, preferably 0.1 μm or more and 0.5 μm or less, more preferably 0.15 μm or more and 0.3 μm or less in terms of number-average particle diameter in water. When the particle diameter of the latex particle is 0.15 μm or more and 0.3 μm or less, the latex particle is excellent in handleability in a centrifugal operation, and a large specific surface area that is a feature of the latex particle becomes conspicuous. The particle diameter of the latex particle of this embodiment was evaluated by a dynamic light scattering method.

The present disclosure also relates to a ligand-sensitized particle for latex immunoagglutination obtained by chemically immobilizing a ligand to the carboxyl group of the latex particle of this embodiment.

The ligand is a compound that is specifically bonded to a receptor that a specific target substance has. The ligand is, for example, an antibody, an antigen, a naturally occurring nucleic acid, an artificial nucleic acid, an aptamer, a peptide aptamer, an oligopeptide, an enzyme, or a coenzyme. The site at which the ligand is bonded to the target substance is decided, and the ligand has a selectively or specifically high affinity for the target substance. Examples of the ligand include: an antigen and an antibody; an enzyme protein and a substrate thereof; a signal substance, such as a hormone or a neurotransmitter, and a receptor thereof; and a nucleic acid. However, the ligand of this embodiment is not limited thereto. The sensitized particle for latex immunoagglutination in this embodiment means a sensitized particle for latex immunoagglutination having a selectively or specifically high affinity for the target substance.

A conventionally known method may be applied as a method for a chemical reaction by which the carboxyl group that the latex particle of this embodiment has and the ligand are chemically immobilized to each other to the extent that the object of the present disclosure can be achieved. For example, a carbodiimide-mediated reaction or an NHS ester activation reaction is a frequently used chemical reaction. However, the method for the chemical reaction by which the carboxyl group and the ligand are chemically immobilized to each other in this embodiment is not limited thereto.

A ligand immobilization amount is also an important factor, and a case in which the ligand immobilization amount is small is not preferred because the reactivity of an antigen or an antibody reduces. Meanwhile, a case in which the ligand immobilization amount is large is responsible for the deterioration of the dispersibility of the ligand-sensitized particle. When the average particle diameter of the ligand-sensitized particles is about 200 nm, the ligand immobilization amount is preferably from 1 μg to 500 μg, particularly preferably from 10 μg to 200 μg with respect to 1 mg of the particles, though the preferred value depends on the particle diameters of the particles.

The latex antibody-sensitized particle for a specimen test of this embodiment may be preferably applied to a latex immunoagglutination assay method, which includes using an antibody or an antigen as a ligand, and has been widely utilized in regions such as a clinical test and biochemical research. When a general particle is applied to the latex immunoagglutination assay method, the antigen (antibody) that is a target substance, foreign matter in serum, or the like nonspecifically adsorbs to the surface of the particle, and unintended particle agglutination resulting from the adsorption is detected to inhibit accurate measurement in some cases. Accordingly, for the purpose of reducing false positive noise, the particle is typically used after having been coated with a biologically derived substance, such as an albumin, as a blocking agent so that the nonspecific adsorption to the surface of the particle may be suppressed. However, the characteristics of such biologically derived substance vary a little from lot to lot, and hence the nonspecific adsorption-suppressing ability of the particle coated with such substance varies from coating treatment to coating treatment. Accordingly, there is a difficulty in stably providing particles having the same level of nonspecific adsorption-suppressing ability. In addition, the biologically derived substance with which the surface of the particle has been coated may show hydrophobicity when modified, and is hence not necessarily excellent in nonspecific adsorption-suppressing ability. The latex particle for a specimen test of this embodiment is a hydrophilized particle, and is a particle improved in nonspecific adsorption-suppressing ability. The particle does not require post-coating with an albumin or the like.

A reagent of this embodiment for use in the latex immunoagglutination method is characterized by including the latex antibody-sensitized particle for a specimen test of this embodiment. The amount of the latex particle for a specimen test of this embodiment to be incorporated into the reagent of this embodiment is preferably from 0.001 mass % to 20 mass %, more preferably from 0.01 mass % to 10 mass %. The reagent of this embodiment may include a third substance, such as a buffer, in addition to the latex antibody-sensitized particle for a specimen test of this embodiment to the extent that the object of the present disclosure can be achieved. The reagent may include two or more kinds of the third substances, such as the buffer, in combination. Examples of the buffer to be used in this embodiment include various buffers such as a phosphate buffer, a glycine buffer, a Good's buffer, a Tris buffer, and an ammonia buffer. However, the buffer to be incorporated into the reagent of this embodiment is not limited thereto.

A kit of this embodiment for use in the detection of a target substance in a specimen by the latex immunoagglutination method is characterized by including at least the reagent of this embodiment. The kit of this embodiment preferably further includes a reaction buffer containing an albumin (hereinafter referred to as "reagent 2") in addition to the reagent of this embodiment (hereinafter referred to as "reagent 1"). The albumin is, for example, serum albumin, and may be subjected to a protease treatment. As a guide, the amount of the albumin to be incorporated into the reagent 2 is from 0.001 mass % to 5 mass %, but the amount of the albumin in the kit of this embodiment is not limited thereto. A sensitizer for latex immunoagglutination assay may be incorporated into each of both, or one, of the reagent 1 and the reagent 2. Examples of the sensitizer for latex immunoagglutination assay include a polyethylene glycol, a polyvinyl alcohol, a polyvinyl pyrrolidone, and a polyalginic acid. However, the sensitizer to be used in the kit of this embodiment is not limited thereto. A surfactant may be incorporated into each of both, or one, of the reagent 1 and the reagent 2. The surfactant has a stabilizing effect on a particle or a protein, and hence, for example, a polyoxyethylene sorbitan monolaurate or a poly(oxyethylene) octyl phenyl ether is suitably used. In addition, the kit of this embodiment may include, for example, a positive control, a negative control, or a serum diluent in addition to the reagent 1 and the reagent 2. In addition to serum or physiological saline free of the target substance that may be subjected to the assay, a solvent may be used as a medium for the positive control or the negative control.

A method of this embodiment of detecting a target substance in a specimen based on the latex immunoagglutination method is characterized by including mixing the latex antibody-sensitized particle for a specimen test of this embodiment and the specimen that may contain the target substance. In addition, the mixing of the latex antibody-sensitized particle for a specimen test of this embodiment and the specimen is preferably performed at a pH in the range of from 3.0 to 11.0. In addition, a mixing temperature preferably falls within the range of from 20° C. to 50° C., and a mixing time preferably falls within the range of from 10 seconds to 30 minutes. In addition, the concentration of the latex antibody-sensitized particle for a specimen test of this embodiment in the detection method of this embodiment is preferably from 0.001 mass % to 5 mass %, more preferably from 0.01 mass % to 1 mass % in a reaction system. The detection method of this embodiment is characterized by including optically detecting an agglutination reaction caused as a result of the mixing of the latex antibody-sensitized particle for a specimen test of this embodiment and the specimen. When the agglutination reaction is optically detected, the target substance in the specimen is detected, and the concentration of the target substance can be measured. As a method of optically detecting the agglutination method, an optical instrument that can detect a scattered light intensity, a transmitted light intensity, an absorbance, and the like only needs to be used to measure the variations of these values.

A preferred method of producing the latex particle of this embodiment is described.

This embodiment is a method of producing a latex particle, and the method includes mixing styrene that is a monomer, glycidyl (meth)acrylate that is a monomer, water, and a radical polymerization initiator to form a parent particle, thereby providing an aqueous dispersion of the parent particle (step 1).

The aqueous dispersion of the parent particle, an ω-amino acid, and a strong base are mixed, and the mixture is heated to cause an epoxy group derived from glycidyl (meth)acrylate of the parent particle and an amino group of the ω-amino acid to react with each other (step 2). An amino alcohol or a mercapto alcohol may be mixed into the dispersion and the base simultaneously with the ω-amino acid.

The radical polymerization initiator is at least one of 4,4'-azobis(4-cyanovaleric acid), 2,2'-azobis[2-methyl-N-(2-hydroxyethyl)propionamide], 2,2'-azobis[N-(2-carboxyethyl)-2-methylpropionamidine] tetrahydrate, 2,2'-azobis(2-methylpropionamidine) dihydrochloride, 2,2'-azobis[2-(2-imidazolin-2-yl)propane], 2,2'-azobis[2-(2-imidazolin-2-yl)propane] dihydrochloride, or 2,2'-azobis[2-(2-imidazolin-2-yl)propane] disulfate dihydrate.

The radical polymerization initiator is preferably one of 2,2'-azobis[2-(2-imidazolin-2-yl)propane] dihydrochloride, 2,2'-azobis[2-(2-imidazolin-2-yl)propane] disulfate dihydrate, 2,2'-azobis[2-(2-imidazolin-2-yl)propane] dihydrochloride, and 2,2'-azobis[2-(2-imidazolin-2-yl)propane].

A method of forming the parent particle of this embodiment is not limited to radical polymerization to the extent that the object of the present disclosure can be achieved. Of various kinds of the radical polymerization, emulsion polymerization, soap-free emulsion polymerization, or suspension polymerization is preferably used, and the soap-free emulsion polymerization is more preferably used. In general, the emulsion polymerization and the soap-free emulsion polymerization can each provide parent particles having a particle diameter distribution sharper than that of parent particles provided by the suspension polymerization. In addition, when a latex particle is chemically immobilized to a ligand, concern is raised about the modification of the ligand by the presence of an anionic surfactant that may be generally used in the emulsion polymerization. Accordingly, the method of forming the parent particle of this embodiment is most preferably the soap-free emulsion polymerization.

In the step 1 of the method of producing a latex particle of this embodiment, a crosslinkable radical-polymerizable monomer is preferably further incorporated in addition to styrene and glycidyl (meth)acrylate. The incorporation of the crosslinkable radical-polymerizable monomer makes the parent particle to be obtained physically strong.

Specific examples of the crosslinkable radical-polymerizable monomer that may be used in this embodiment are listed below, but the present disclosure is not limited thereto. In addition, two or more kinds of oily radical-polymerizable monomers may be used. A case in which divinylbenzene out of the listed radical-polymerizable monomers is used is preferred because divinylbenzene is excellent in handleability at the time of its radical polymerization reaction.

Examples of the crosslinkable radical-polymerizable monomer include: diethylene glycol diacrylate, triethylene glycol diacrylate, tetraethylene glycol diacrylate, polyethylene glycol diacrylate, 1,6-hexanediol diacrylate, neopentyl glycol diacrylate, tripropylene glycol diacrylate, polypropylene glycol diacrylate, 2,2'-bis(4-(acryloxydiethoxy)phenyl)propane, trimethylolpropane triacrylate, tetramethylolmethane tetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2'-bis(4-(methacryloxydiethoxy)phenyl)propane, 2,2'-bis(4-(methacryloxypolyethoxy)phenyl)propane, trimethylolpropane trimethacrylate, tetramethylolmethane tetramethacrylate, divinylbenzene, divinylnaphthalene, and divinyl ether.

The step 1 of the method of producing a latex particle of this embodiment preferably further includes a step of further mixing glycidyl (meth)acrylate that is a monomer in a process for the formation of the parent particle to coat the surface of the parent particle with a polyglycidyl (meth)acrylate.

The radical polymerization initiator is at least one of 4,4'-azobis(4-cyanovaleric acid), 2,2'-azobis[2-methyl-N-(2-hydroxyethyl)propionamide], 2,2'-azobis[N-(2-carboxyethyl)-2-methylpropionamidine] tetrahydrate, 2,2'-azobis(2-methylpropionamidine) dihydrochloride, 2,2'-azobis[2-(2-imidazolin-2-yl)propane], 2,2'-azobis[2-(2-imidazolin-2-yl) propane] dihydrochloride, or 2,2'-azobis[2-(2-imidazolin-2-yl)propane] disulfate dihydrate because the ring opening of an epoxy group derived from glycidyl (meth)acrylate is prevented in the step 1 of providing the aqueous dispersion of the parent particles. For example, when potassium persulfate is used as the radical polymerization initiator, a radical polymerization reaction field becomes acidic under the influence of the initiator residue. Accordingly, the epoxy group derived from glycidyl (meth)acrylate reacts with water to undergo ring opening, and hence a glycol is formed in some cases. In addition, when ammonium persulfate is used as the radical polymerization initiator, the epoxy group derived from glycidyl (meth)acrylate and ammonia may react with each other. In addition, when an anionic radical polymerization initiator having a carboxyl group is used as the radical polymerization initiator, the epoxy group derived from glycidyl (meth)acrylate and the carboxyl group derived from the polymerization initiator react with each other to agglutinate the parent particles.

The step 2 is a step of introducing the amino group of the ω-amino acid into the epoxy group derived from glycidyl (meth)acrylate of the parent particle. At this time, a strong base, such as sodium hydroxide or potassium hydroxide, is preferably used because the use of a weak base, such as triethylamine, precludes efficient introduction of the group. Unless the groups are sufficiently caused to react with each other, and the resultant is purified, particles to be obtained easily agglutinate. Accordingly, there is a need to cause the groups to react with each other at a reaction temperature of from 50° C. to 90° C., and to purify the resultant through use of centrifugal separation or dialysis after the reaction.

EXAMPLES

Now, the present disclosure is described in detail by way of Examples. However, the present disclosure is not limited to these Examples.

Synthesis Example 1

Synthesis of Parent Particles 22.7 Grams of styrene (St: Kishida Chemical Co., Ltd.), 33.9 g of glycidyl methacrylate (GMA: Tokyo Chemical Industry Co., Ltd.), 0.86 g of divinylbenzene (DVB: Kishida Chemical Co., Ltd.), and 2,168.6 g of ion-exchanged water were weighed in a 2-liter four-necked separable flask to provide a mixed liquid. After that, the mixed liquid was held at 70° C. while being stirred at 200 rpm, and nitrogen was flowed at a flow rate of 200 mL/min to deoxidize the inside of the four-necked separable flask. Next, a separately prepared dissolved liquid, which had been obtained by dissolving 1.13 g of V-50 (FUJIFILM Wako Pure Chemical Corporation) in 30 g of ion-exchanged water, was added to the mixed liquid to initiate soap-free emulsion polymerization. Two hours after the initiation of the polymerization, 5.8 g of GMA was added to the four-necked separable flask, and the mixture was held at 70° C. while being stirred for 22 hours at 200 rpm. Thus, an aqueous dispersion containing parent particles was obtained. After the dispersion had been gradually cooled to room temperature, part of the dispersion was collected, and its polymerization conversion ratio was evaluated by using proton NMR, gas chromatography, and gel permeation chromatography. As a result, it was recognized that the polymerization conversion ratio was substantially 100%. The evaluation of the dispersion through use of dynamic light scattering (ZETASIZER: Malvern Panalytical Ltd.) found that its average particle diameter was 206.9 nm. The parent particles were subjected to ultrafiltration concentration, or were diluted by the addition of ion-exchanged water, so as to be a 2.86 wt % aqueous dispersion, and the dispersion was stored under a light-shielding condition at 4° C.

Example 1

Synthesis of Aqueous Dispersion of Latex Particles 1

10.5 Grams of the 2.86 wt % aqueous dispersion of the parent particles 1 was loaded into a 30-milliliter vial, and a liquid separately obtained by dissolving 151 mg (1.29 mmol) of 5-aminopentanoic acid (Tokyo Chemical Industry Co., Ltd.) and 57 mg (1.425 mmol) of 0.7-millimeter granular sodium hydroxide (Kishida Chemical Co., Ltd.) in 4.4 g of ion-exchanged water was added thereto. Next, the temperature of the contents in the vial was increased to 70° C. while the contents were stirred at 200 rpm. Further, the contents were held at the temperature for 4 hours to provide a dispersion of latex particles 1. The latex particles 1 were separated from the dispersion with a centrifugal separator, and the latex particles 1 were re-dispersed in ion-exchanged water; the operation was repeated eight times to purify the latex particles 1. Thus, an aqueous dispersion in which the concentration of the latex particles 1 was finally adjusted to about 4 wt % was obtained.

Example 2

Synthesis of Aqueous Dispersion of Latex Particles 2

An aqueous dispersion in which the concentration of latex particles 2 was finally adjusted to about 4 wt % was obtained by the same experimental operation as that of Example 1 except that the ω-amino acid of Example 1 was changed from 1.29 mmol of 5-aminopentanoic acid to 1.29 mmol of 6-aminohexanoic acid.

Example 3

Synthesis of Aqueous Dispersion of Latex Particles 3

An aqueous dispersion in which the concentration of latex particles 3 was finally adjusted to about 4 wt % was obtained by the same experimental operation as that of Example 1 except that the ω-amino acid of Example 1 was changed from 1.29 mmol of 5-aminopentanoic acid to 1.29 mmol of 7-aminoheptanoic acid.

Example 4

Synthesis of Aqueous Dispersion of Latex Particles 4

An aqueous dispersion in which the concentration of latex particles 4 was finally adjusted to about 4 wt % was obtained by the same experimental operation as that of Example 1 except that the ω-amino acid of Example 1 was changed from 1.29 mmol of 5-aminopentanoic acid to 1.29 mmol of 11-aminoundecanoic acid.

Example 5

Synthesis of Aqueous Dispersion of Latex Particles 5

An aqueous dispersion in which the concentration of latex particles 5 was finally adjusted to about 4 wt % was obtained by the same experimental operation as that of Example 1 except that the ω-amino acid of Example 1 was changed from 1.29 mmol of 5-aminopentanoic acid to 1.29 mmol of 12-aminododecanoic acid.

Example 6

Synthesis of Aqueous Dispersion of Latex Particles 6

An aqueous dispersion in which the concentration of latex particles 6 was finally adjusted to about 4 wt % was obtained by the same experimental operation as that of Example 1 except that the base of Example 1 was changed from 1.425 mmol of the 0.7-millimeter granular sodium hydroxide to 1.425 mmol of potassium hydroxide.

Example 7

Synthesis of Aqueous Dispersion of Latex Particles 7

10.5 Grams of the 2.86 wt % aqueous dispersion of the parent particles 1 was loaded into a 30-milliliter vial, and a liquid separately obtained by dissolving 169 mg (1.29 mmol) of 6-aminohexanoic acid (Tokyo Chemical Industry Co., Ltd.), 79 mg (1.29 mmol) of 2-ethanolamine, and 114 mg (2.95 mmol) of 0.7-millimeter granular sodium hydroxide (Kishida Chemical Co., Ltd.) in 4.4 g of ion-exchanged water was added thereto. Next, the temperature of the contents in the vial was increased to 70° C. while the contents were stirred at 200 rpm. Further, the contents were held at the temperature for 4 hours to provide a dispersion of latex particles 7. The latex particles 7 were separated from the dispersion with a centrifugal separator, and the latex particles 7 were re-dispersed in ion-exchanged water; the operation was repeated eight times to purify the latex particles 7. Thus, an aqueous dispersion in which the concentration of the latex particles 7 was finally adjusted to about 4 wt % was obtained.

Example 8

Synthesis of Aqueous Dispersion of Latex Particles 8

10.5 Grams of the 2.86 wt % aqueous dispersion of the parent particles 1 was loaded into a 30-milliliter vial, and a liquid separately obtained by dissolving 169 mg (1.29 mmol) of 6-aminohexanoic acid (Tokyo Chemical Industry Co., Ltd.), 139 mg (1.29 mmol) of 3-mercapto-1,2-propanediol, and 114 mg (2.95 mmol) of 0.7-millimeter granular sodium hydroxide (Kishida Chemical Co., Ltd.) in 4.4 g of ion-exchanged water was added thereto. Next, the temperature of the contents in the vial was increased to 70° C. while the contents were stirred at 200 rpm. Further, the contents were held at the temperature for 4 hours to provide a dispersion of latex particles 8. The latex particles 8 were separated from the dispersion with a centrifugal separator, and the latex particles 8 were re-dispersed in ion-exchanged water; the operation was repeated eight times to purify the latex particles 8. Thus, an aqueous dispersion in which the concentration of the latex particles 8 was finally adjusted to about 4 wt % was obtained.

Comparative Example 1

Synthesis of Aqueous Dispersion of Comparative Latex Particles 1

An aqueous dispersion in which the concentration of comparative latex particles 1 was finally adjusted to about 4 wt % was obtained by the same experimental operation as that of Example 1 except that the ω-amino acid of Example 1 was changed from 1.29 mmol of 5-aminopentanoic acid to 1.29 mmol of glycine.

Comparative Example 2

Synthesis of Aqueous Dispersion of Comparative Latex Particles 2

An aqueous dispersion in which the concentration of comparative latex particles 2 was finally adjusted to about 4 wt % was obtained by the same experimental operation as that of Example 1 except that the ω-amino acid of Example 1 was changed from 1.29 mmol of 5-aminopentanoic acid to 1.29 mmol of 4-aminobutyric acid.

Comparative Example 3

Synthesis of Aqueous Dispersion of Comparative Latex Particles 3

An aqueous dispersion in which the concentration of comparative latex particles 3 was finally adjusted to about 4 wt % was obtained by the same experimental operation as that of Example 3 except that the base of Example 3 was changed from 1.425 mmol of the 0.7-millimeter granular sodium hydroxide to 1.425 mmol of triethylamine.

Comparative Example 4

Synthesis of Aqueous Dispersion of Comparative Latex Particles 4

An aqueous dispersion in which the concentration of comparative latex particles 4 was finally adjusted to about 4 wt % was obtained by the same experimental operation as that of Example 2 except that the base of Example 2 was changed from 1.425 mmol of the 0.7-millimeter granular sodium hydroxide to 1.425 mmol of sodium hydrogen carbonate.

Production of Antibody-Sensitized Particles by Antibody Sensitization to Particles The respective aqueous dispersions of the latex particles obtained in the foregoing were each adjusted to a solution having a concentration of 1.0 wt % with ion-exchanged water. After that, 0.1 mL (1 mg of the particles) of each particle dispersion (solution having a concentration of 1.0 wt %, 10 mg/mL) was transferred to a microtube (volume: 1.5 mL), and 0.12 mL of an activation buffer (25 mM MES, pH: 6.0) was added thereto, followed by centrifugation at 4° C. and 15,000 rpm (20,400 g) for 5 minutes. After the centrifugation, the supernatant was disposed of. 0.12 Milliliter of the activation buffer (25 mM MES, pH: 6.0) was added to the residue, and was re-dispersed therein with an ultrasonic wave. The centrifugation and the re-dispersion were each repeated once.

Next, 60 μL each of a WSC solution (solution obtained by dissolving 50 mg of WSC in 1 mL of an activation buffer, the term "WSC" means 1-[3-(dimethylaminopropyl)-3-ethylcarbodiimide] hydrochloride) and a Sulfo NHS solution (solution obtained by dissolving 50 mg of Sulfo NHS in 1 mL of an activation buffer, the term "Sulfo NHS" means sulfo-N-hydroxysuccinimide) were added to the resultant, and were dispersed therein with an ultrasonic wave. The dispersion was stirred at room temperature for 30 minutes to transform the carboxyl groups of its particles into active esters. The resultant was centrifuged at 4° C. and 15,000 rpm (20,400 g) for 5 minutes, and the supernatant was disposed of 0.2 Milliliter of an immobilization buffer (25 mM MES, pH: 5.0) was added to the residue, and was dispersed therein with an ultrasonic wave. The dispersion was centrifuged at 4° C. and 15,000 rpm (20,400 g) for 5 minutes, and the supernatant was disposed of. 50 Microliters of the immobilization buffer was added to the residue, and the particles whose carboxyl groups had been activated were dispersed in the mixture with an ultrasonic wave.

50 Microliters of an antibody solution (solution obtained by diluting an anti-CRP antibody with the immobilization buffer so that its concentration became 25 μg/50 μL) was added to 50 μL of the solution of the particles whose carboxyl groups had been activated, and the particles were dispersed in the mixture with an ultrasonic wave. The loading amount of the antibody is 25 μg per 1 mg of the particles (25 μg/mg). An antibody final concentration is 0.25 mg/mL, and a particle final concentration is 10 mg/mL. The contents in the microtube were stirred at room temperature for 60 minutes to bond the antibody to the carboxyl groups of the particles. Next, the resultant was centrifuged at 4° C. and 15,000 rpm (20,400 g) for 5 minutes, and the supernatant was disposed of 0.24 Milliliter of a masking buffer (buffer obtained by incorporating 0.1% Tween 20 into 1 M Tris having a pH of 8.0) was added to the residue, and was dispersed therein with an ultrasonic wave. The dispersion was stirred at room temperature for 1 hour, and was then left at rest at 4° C. overnight to bond Tris to the remaining activated carboxyl groups. Next, the resultant was centrifuged at 4° C. and 15,000 rpm (20,400 g) for 5 minutes, and the supernatant was disposed of. 0.2 Milliliter of a washing buffer (10 mM HEPES, pH: 7.9) was added to the residue, and was dispersed therein with an ultrasonic wave. The washing operation (the centrifugation and the re-dispersion) with the washing buffer (10 mM HEPES, pH: 7.9) was repeated once. A washing operation was performed with 0.2 mL of a storage buffer (10 mM HEPES, pH: 7.9, containing 0.01% Tween 20) once. 1.0 Milliliter of the storage buffer was added to the washed product, and was dispersed therein with an ultrasonic wave. The particle concentration of the dispersion finally became 0.1 wt % (1 mg/mL). The dispersion was stored in a refrigerator.

(Antibody Sensitization Efficiency of Latex Particles)

The antibody sensitization efficiencies (%) of the latex particles produced in Examples 1 to 8 and Comparative Examples 1 to 4 were determined by protein determination. Herein, the term "antibody sensitization efficiency (%)" means the ratio of the amount of the antibody bonded to the latex particles to the amount of the antibody used in the reaction with the particles (antibody loading amount). An evaluation example of the protein determination is described below.

First, 7 mL of the liquid A of PROTEIN ASSAY BCA KIT (Wako Pure Chemical Industries, Ltd.) and 140 µL of the liquid B thereof were mixed, and the prepared liquid was adopted as a liquid AB. Next, 25 µL (particle amount: 25 µg) of the dispersion (0.1% solution) of the latex particles was fractionated, and was loaded into a 1.5-milliliter tube. Next, 200 µL of the liquid AB was added to the dispersion (25 µL), and the mixture was incubated at 60° C. for 30 minutes. The resultant solution was centrifuged at 4° C. and 15,000 rpm (20,400 g) for 5 minutes, and 200 µL of the supernatant was loaded into a 96-well microwell with a pipetter. The absorbance of the supernatant at 562 nm was measured with a microplate reader together with standard samples (several samples were obtained by diluting the antibody with 10 mM HEPES so that its concentration fell within the range of from 0 µg/mL to 200 µg/mL). The amount of the antibody was calculated from a standard curve. The amount of the antibody sensitized to the particles (the amount of the bonded antibody per weight of the particles (µm/mg)) was determined by dividing the calculated antibody amount by the weight of the particles (herein, 0.025 mg). Finally, the sensitization efficiency was calculated. In the case where the antibody loading amount is 25 µg per 1 mg of the particles, when the antibody sensitization amount is 12.5 µg/mg, the sensitization efficiency is 50%. The results are summarized in Table 1.

(Evaluation of Latex Agglutination Sensitivity of Antibody-sensitized Particles)

One microliter of human CRP (Denka Seiken Co., Ltd., C-reactive protein, derived from human plasma, 320 µg/mL) and 50 µL of a buffer (PBS containing 0.01% Tween 20) were mixed to prepare a mixed liquid (hereinafter represented as "R1+"), and its temperature was kept at 37° C. In addition, 1 µL of physiological saline and 50 µL of the buffer (PBS containing 0.01% Tween 20) were mixed to prepare a mixed liquid (hereinafter represented as "R1−") as a control, and its temperature was similarly kept at 37° C. Next, 50 µL of the solution containing the antibody-sensitized particles prepared in each of Examples and Comparative Examples (particle concentration: 0.1 wt %, referred to as "R2") was mixed with R1+ or R1−, and the absorbance of the mixed liquid (volume: 101 µL) immediately after its stirring at a wavelength of 572 nm was measured. A spectrophotometer GeneQuant 1300 manufactured by Biochrom was used in the absorbance measurement. Then, the mixed liquid was left at rest at 37° C. for 5 minutes, and then its absorbance at a wavelength of 572 nm was measured again, followed by the calculation of the value "variation $\Delta ABS$ in absorbance× 10,000". The results are summarized in Table 1. A larger value of the R1− in Table 1 means that agglutination resulting from nonspecific adsorption or osmotic pressure agglutination occurs in the antibody-sensitized particles to a larger extent. Accordingly, when the particles are used as particles for a latex agglutination method in a specimen test, concern is raised in that a normal specimen is interpreted as being false positive owing to noise. Meanwhile, antibody-sensitized particles having a larger value of the R1+ in Table 1 are expected to be capable of detecting a target substance with higher sensitivity when used as antibody-sensitized particles for the latex agglutination method in the specimen test.

Criteria for a comprehensive evaluation were defined as described below.

A: The sensitization efficiency is 50% or more, and the $\Delta OD \times 10,000$ at the time of the addition of the R1+ is 5,000 or more.

B+: The sensitization efficiency is 50% or less, and the $\Delta OD \times 10,000$ at the time of the addition of the R1+ is 5,000 or more.

B−: The sensitization efficiency is 50% or more, and the $\Delta OD \times 10,000$ at the time of the addition of the R1+ is 5,000 or less.

C: The sensitization efficiency is 50% or less, and the $\Delta OD \times 10,000$ at the time of the addition of the R1+ is 5,000 or less.

When the $\Delta OD \times 10,000$ at the time of the addition of the R1− was 100 or less, it was judged that no nonspecific adsorption occurred.

TABLE 1

| No. | ω-Amino acid n | Kind of alcohol | Kind of base | Sensitization efficiency % | R1− $\Delta OD*10,000$ when concentration is 0 µg/mL/— | R1+ $\Delta OD*10,000$ when concentration is 320 µg/mL/— | Comprehensive evaluation |
|---|---|---|---|---|---|---|---|
| Example 1 | 4 | — | Sodium hydroxide | 100 | 0 | 8,230 | A |
| Example 2 | 5 | — | Sodium hydroxide | 57 | 0 | 13,250 | A |
| Example 3 | 6 | — | Sodium hydroxide | 90 | 0 | 12,290 | A |
| Example 4 | 10 | — | Sodium hydroxide | 100 | 0 | 10,210 | A |
| Example 5 | 11 | — | Sodium hydroxide | 100 | 0 | 9,620 | A |
| Example 6 | 5 | — | Potassium hydroxide | 100 | 30 | 12,640 | A |
| Example 7 | 5 | 2-Ethanolamine | Sodium hydroxide | 41 | 30 | 13,210 | B+ |
| Example 8 | 5 | 3-Mercapto-1,2-propanediol | Sodium hydroxide | 33 | 0 | 8,850 | B+ |
| Comparative Example 1 | 1 | — | Sodium hydroxide | 45 | 10 | 2,940 | C |
| Comparative Example 2 | 3 | — | Sodium hydroxide | 55 | 70 | 4,160 | B− |
| Comparative Example 3 | 6 | — | Triethylamine | 9 | 0 | 0 | C |
| Comparative Example 4 | 5 | — | Sodium hydrogen carbonate | 29 | 560 | 1,790 | C |

As can be seen from Examples 1 to 6, and Comparative Examples 1 and 2 in Table 1, while when such an ω-amino acid that "n" in the general formula (1) represents 1 or 3 out of the ω-amino acids is used, the sensitization efficiency and the sensitivity ($\Delta OD \times 10,000$) are low, when such an ω-amino acid that "n" in the general formula (1) represents a value in the range of from 4 to 11 is used, the sensitization efficiency and the sensitivity (ΔOD×10,000) are high. In addition, as can be seen from Examples 2 and 3, and Comparative Examples 3 and 4, the sensitization efficiency and the sensitivity (ΔOD×10,000) are improved by causing the parent particles and the ω-amino acid to react with each other through use of a strong base instead of a weak base. As can be seen from Examples 7 and 8, when an alcohol species is introduced simultaneously with the parent particles, the ω-amino acid, and the strong base, the sensitivity (ΔOD×10,000) can be maintained at a high value, though the sensitization efficiency reduces. The simultaneous introduction of the alcohol species can improve the hydrophilicity of the antibody-sensitized particles to suppress the nonspecific adsorption thereof to a human normal specimen.

In each of Examples 1 to 8, the antibody-sensitized particles hardly caused nonspecific adsorption even when not post-coated, that is, the sensitivity (ΔOD×10,000) at the time of the addition of the R1– was 100 or less.

No antibody-sensitized particles agglutinated during their storage.

According to the present disclosure, there can be provided the particle suitable for a specimen test, which has high sensitization efficiency in a reaction with an antibody, shows high detection sensitivity as a latex reagent, hardly agglutinates during its storage, and hardly causes nonspecific adsorption even when not post-coated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-194679, filed Oct. 25, 2019, which is hereby incorporated by reference herein in its entirety.

What is claimed is:

1. A particle comprising a copolymer containing a monomer unit derived from a styrene-based monomer and a monomer unit derived from a glycidyl group-containing monomer, the particle being represented by the following general formula (1):

General Formula (1)

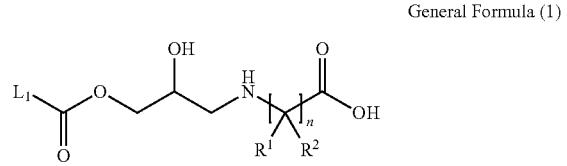

in the general formula (1), $L_1$ represents a copolymer moiety containing the monomer unit derived from the styrene-based monomer and the monomer unit derived from the glycidyl group-containing monomer, "n" represents from 4 to 11, and $R^1$ and $R^2$ each represent a hydrogen atom, an alkyl group, or a halogen.

2. The particle according to claim 1, wherein in the general formula (1), $R^1$ and $R^2$ each represent a hydrogen atom.

3. The particle according to claim 1, wherein the general formula (1) further comprises a site represented by the following general formula (2):

General Formula (2)

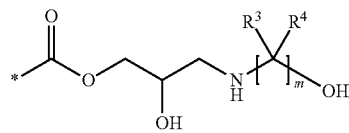

in the general formula (2), * represents a site to be bonded to $L_1$ of the general formula (1), "m" represents from 2 to 4, and $R^3$ and $R^4$ each represent a hydrogen atom.

4. The particle according to claim 1, wherein the general formula (1) further comprises a site represented by the following general formula (3):

General Formula (3)

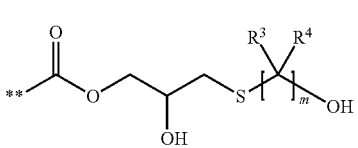

in the general formula (3), ** represents a site to be bonded to $L_1$ of the general formula (1), "m" represents from 2 to 4, and $R^3$ and $R^4$ each represent a hydrogen atom or a hydroxy group.

5. The particle according to claim 1, wherein the particle is suitable for use in an agglutination method.

6. The particle according to claim 1, wherein the particle is a latex particle.

7. The particle according to claim 1, wherein the particle is suitable for use in a specimen test.

8. A method of producing a particle including a copolymer containing a monomer unit derived from a styrene-based monomer and a monomer unit derived from a glycidyl group-containing monomer, the particle being represented by the following general formula (1):

General Formula (1)

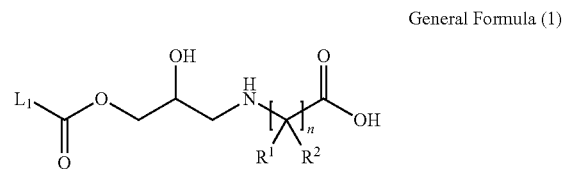

in the general formula (1), $L_1$ represents a copolymer moiety containing the monomer unit derived from the styrene-based monomer and the monomer unit derived from the glycidyl group-containing monomer, "n" represents from 4 to 11, and $R^1$ and $R^2$ each represent a hydrogen atom, an alkyl group, or a halogen, the method comprising using one of sodium hydroxide and potassium hydroxide to bond a spacer molecule to a glycidyl group, followed by purification of the resultant by one of centrifugal separation and dialysis.

* * * * *